(12) United States Patent
Yoshizawa et al.

(10) Patent No.: US 12,227,089 B2
(45) Date of Patent: Feb. 18, 2025

(54) VEHICLE DRIVE SYSTEM

(71) Applicant: SUBARU CORPORATION, Tokyo (JP)

(72) Inventors: Satoshi Yoshizawa, Tokyo (JP); Tomoyuki Okada, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 116 days.

(21) Appl. No.: 18/084,082

(22) Filed: Dec. 19, 2022

(65) Prior Publication Data
US 2023/0219429 A1    Jul. 13, 2023

(30) Foreign Application Priority Data
Jan. 12, 2022    (JP) .................................. 2022-002867

(51) Int. Cl.
*H02P 9/30* (2006.01)
*B60L 7/14* (2006.01)
*B60L 7/16* (2006.01)
*B60L 50/51* (2019.01)
*H02P 6/12* (2006.01)

(52) U.S. Cl.
CPC ................ *B60L 50/51* (2019.02); *B60L 7/14* (2013.01); *B60L 7/16* (2013.01); *B60L 2210/42* (2013.01); *B60L 2240/527* (2013.01); *B60L 2240/547* (2013.01)

(58) Field of Classification Search
CPC ...... H02P 27/06; H02P 27/08; H02P 2201/09; H02P 1/32; H02P 23/26; H02P 25/18; H02P 25/184; H02P 27/04; H02P 2201/07; H02P 2201/15; H02P 2101/15; H02P 2207/05; H02P 29/02; H02P 29/68; H02P 3/14; H02P 5/74; H02P 6/00; H02P 6/04; H02P 6/08; H02P 6/28; H02P 9/04; H02P 27/12; H02P 9/08
See application file for complete search history.

(56) References Cited

U.S. PATENT DOCUMENTS

| | | | |
|---|---|---|---|
| 11,128,251 B1 * | 9/2021 | Solodovnik | H02P 25/22 |
| 2016/0204728 A1 * | 7/2016 | Notohara | B60L 7/14 |
| | | | 310/198 |
| 2020/0198563 A1 * | 6/2020 | Niimi | H02J 7/0024 |

FOREIGN PATENT DOCUMENTS

| | | | | |
|---|---|---|---|---|
| GB | 2400758 B | * | 9/2005 | ................ B60L 9/30 |
| JP | 2009-27870 A | | 2/2009 | |
| JP | 2016-131444 A | | 7/2016 | |

* cited by examiner

*Primary Examiner* — Kawing Chan
*Assistant Examiner* — Charles S Laughlin
(74) *Attorney, Agent, or Firm* — TROUTMAN PEPPER LOCKE LLP (57) ABSTRACT

A vehicle drive system includes a battery, at least one drive motor, inverter circuits, a step-up circuit, and a switch. The inverter circuits are configured to drive the at least one drive motor. The step-up circuit is connected between the battery and the inverter circuits. The switch is configured to switch a connection state of the inverter circuits to the step-up circuit between series connection and parallel connection.

12 Claims, 8 Drawing Sheets

VEHICLE DRIVE SYSTEM

CROSS-REFERENCE TO RELATED APPLICATIONS

The present application claims priority from Japanese Patent Application No. 2022-002867 filed on Jan. 12, 2022, the entire contents of which are hereby incorporated by reference.

FIELD OF THE INVENTION

The disclosure relates to a vehicle drive system.

BACKGROUND

A hybrid electric vehicle and an electric vehicle with no internal combustion engine aboard (hereinafter collectively referred to as "electric vehicles") include a drive motor configured to output driving force of the vehicle. The drive motor is also used as a regenerative brake in deceleration of the vehicle, and performs power generation by utilizing rotational torque of wheels (hereinafter also referred to as "regenerative power generation"). A battery is charged with power resulting from the regenerative power generation (regeneratively generated power). An electric vehicle put to practical use so far includes a single drive motor, and drive of this drive motor is controlled by a single inverter (see, for example, Japanese Unexamined Patent Application Publication (JP-A) No. 2009-027870).

Recently, a progress has been made in putting an electric vehicle including plural drive motors into practical use. Examples include an electric vehicle with a front-wheel drive motor and a rear-wheel drive motor, and an electric vehicle with a drive motor corresponding to each wheel. Moreover, a research has been made on an electric vehicle where a double-stator axial gap motor including two stators is used as a drive motor (see, for example, JP-A No. 2016-131444). In such an electric vehicle, inverters configured to drive the drive motors or the stators are in parallel connection to a battery.

SUMMARY

An aspect of the disclosure provides a vehicle drive system including: a battery; at least one drive motor; inverter circuits configured to drive the at least one drive motor; a step-up circuit connected between the battery and the inverter circuits; and a switch configured to switch a connection state of the inverter circuits to the step-up circuit between series connection and parallel connection.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to describe the principles of the disclosure.

DETAILED DESCRIPTION

It is known that when a drive motor is used as a regenerative brake, a voltage of regeneratively generated power (hereinafter also referred to as "regenerative power voltage") output from an inverter is proportional to a rotational speed of the drive motor. Consequently, when a vehicle decelerates during low-speed or medium-speed travel, the regenerative power voltage may be insufficient for a charging voltage of a battery. Actually, deceleration of the vehicle is more frequent during low-speed or medium-speed travel than during high-speed travel. In view of this, there is a technique of providing a step-up circuit between the inverter and the battery. When the regenerative power voltage and the charging voltage of the battery have a large difference, a current of regeneratively generated power (hereinafter also referred to as "regenerative power current") output from the inverter at a lower voltage side is to be increased. When the regenerative power current is increased to raise the regenerative power voltage to the charging voltage of the battery, the number of times of driving a switching element provided in the inverter is increased. This may result in an increased energy loss by heat, which may decrease regenerative power efficiency.

It is desirable to provide a vehicle drive system that makes it possible to prevent regenerative power efficiency from decreasing when raising a regenerative power voltage and charging a battery.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First, a description will be given on an example of general arrangement of a vehicle where a vehicle drive system according to a first embodiment of the disclosure is applied.

The vehicle drive system according to the first embodiment includes a drive motor configured to drive front wheels. As the drive motor, a double-stator axial gap motor is employed.

Figure 1:
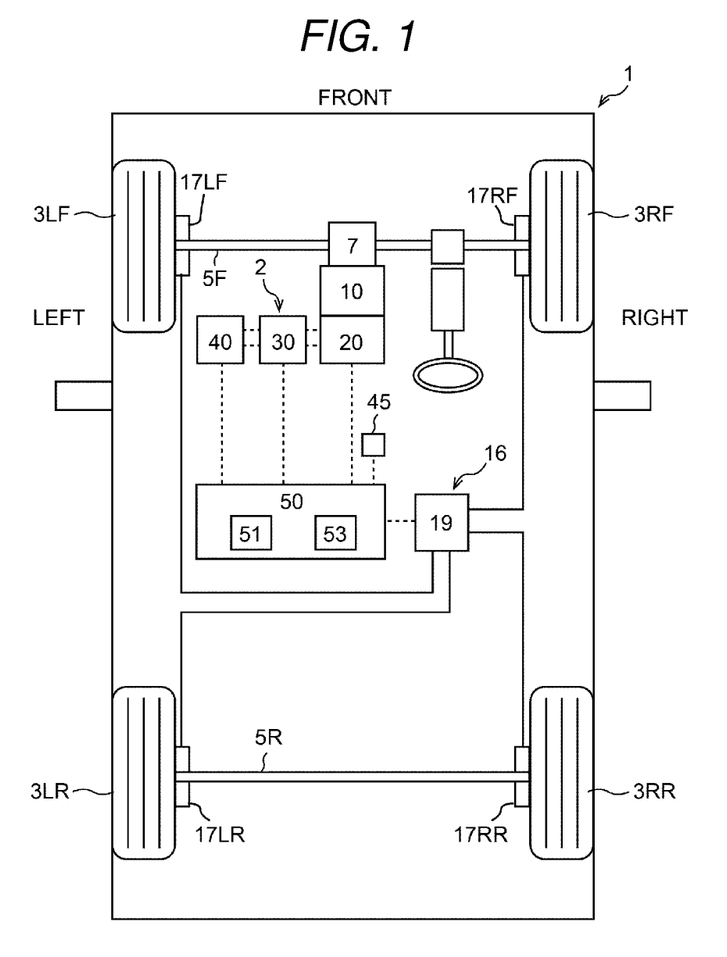
FIG. 1 is a schematic diagram illustrating a configuration example of a vehicle where a vehicle drive system according to an embodiment of the disclosure is applicable.

FIG. 1 is a schematic diagram illustrating a configuration example of a vehicle 1 where a vehicle drive system 2 according to the first embodiment is applied. The vehicle 1 illustrated in FIG. 1 is a four-wheel electric vehicle including a left front wheel 3LF, a right front wheel 3RF, a left rear wheel 3LR, and a right rear wheel 3RR (hereinafter generally referred to as "wheels 3" unless specified otherwise). The vehicle 1 is a two-wheel drive electric vehicle where a drive motor 10 serves as a driving force source configured to generate drive torque for the vehicle 1, and the drive torque output from the drive motor 10 is transmitted to the left front wheel 3LF and the right front wheel 3RF (hereinafter generally referred to as "front wheels 3F" unless specified otherwise).

The vehicle 1 includes the vehicle drive system 2 and a hydraulic brake system 16. The hydraulic brake system 16 includes brake devices 17LF, 17RF, 17LR, and 17RR (hereinafter collectively referred to as "brake devices 17") provided for the respective wheels 3, and a brake hydraulic pressure control device 19 configured to control a hydraulic pressure supplied to each of the brake devices 17. The brake device 17 is configured to apply a braking force to the corresponding wheel 3 by utilizing the hydraulic pressure supplied to cause brake pads to hold a brake disk rotating with the wheel 3, for example. The brake hydraulic pressure control device 19 includes an electric motor pump configured to discharge brake fluid, electromagnetic valves configured to regulate a hydraulic pressure supplied to each of the brake devices 17, and a brake controller configured to control drive of the electric motor pump and the electromagnetic valves. The hydraulic brake system 16 controls the hydraulic pressure supplied to each of the brake devices 17 so as to generate a predetermined braking force for each of the front and rear, left and right drive wheels 3LF, 3RF, 3LR, and 3RR. The hydraulic brake system 16 and the regenerative brake utilizing the drive motor 10 are both used.

The vehicle drive system 2 includes the drive motor 10, an inverter unit 20, a converter unit 30, a battery 40, and a vehicle control device 50. A configuration example of the vehicle drive system 2 will be described in detail later.

The vehicle 1 includes a vehicle state sensor 45. The vehicle state sensor 45 is coupled to the vehicle control device 50 via an exclusive-use line or a communication system such as controller area network (CAN) or local internet (LIN).

The vehicle state sensor 45 includes one or more sensors configured to detect operation states and behaviors of the vehicle 1 (hereinafter collectively referred to as "vehicle states"). The vehicle state sensor 45 includes one or more of a steering angle sensor, an accelerator position sensor, a brake stroke sensor, a brake pressure sensor, and an engine speed sensor, for example, and detects operation states of the vehicle 1 such as a steering angle of a steering wheel or steered wheels, an accelerator opening degree, a brake operation amount, and an engine speed. Moreover, the vehicle state sensor 45 includes one or more of a vehicle speed sensor, an acceleration sensor, and an angular velocity sensor, for example, and detects behaviors of the vehicle 1 such as a vehicle speed, a longitudinal acceleration, a lateral acceleration, and a yaw rate. The vehicle state sensor 45 transmits a sensor signal including detected information to the vehicle control device 50.

In the first embodiment, the vehicle state sensor 45 at least includes the accelerator position sensor, the brake stroke sensor, and the vehicle speed sensor. The accelerator position sensor detects an operation amount of an accelerator pedal by a driver. For example, the accelerator position sensor may be a sensor configured to detect a rotation amount of a rotary shaft of the accelerator pedal. However, this is not to be construed in a limiting sense. The brake stroke sensor detects an operation amount of a brake pedal by the driver. The brake stroke sensor may be a sensor configured to detect a movement amount of an output rod coupled to the brake pedal, or may be a sensor configured to detect a rotation amount of a rotary shaft of the brake pedal, or may be a sensor configured to detect a pressure on the brake pedal. However, this is not to be construed in a limiting sense. The vehicle speed sensor may be, for example, a sensor configured to detect a rotational speed of one of a rotary shaft of the drive motor 10, or a front-wheel drive shaft 5F, or a rear-wheel drive shaft 5R. However, this is not to be construed in a limiting sense.

Next, the configuration example of the vehicle drive system 2 according to the first embodiment will be described.

Figure 2:
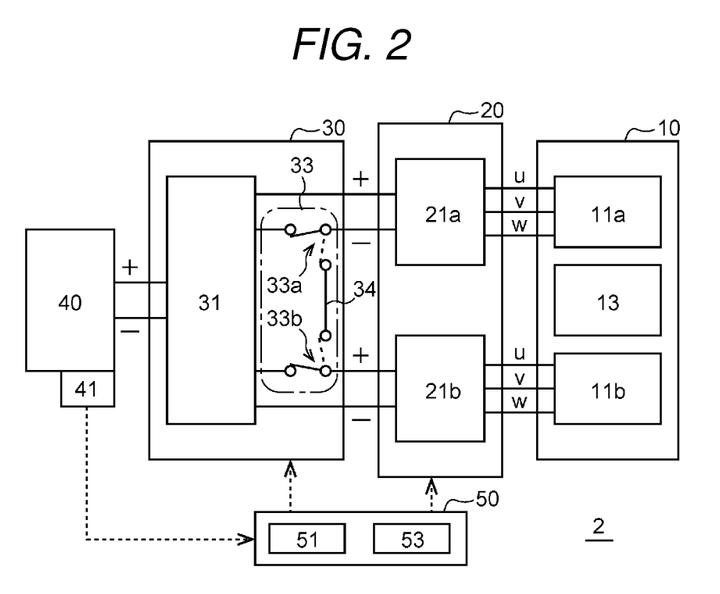
FIG. 2 is a block diagram illustrating a configuration example of the vehicle drive system according to the embodiment.
Figure 3:
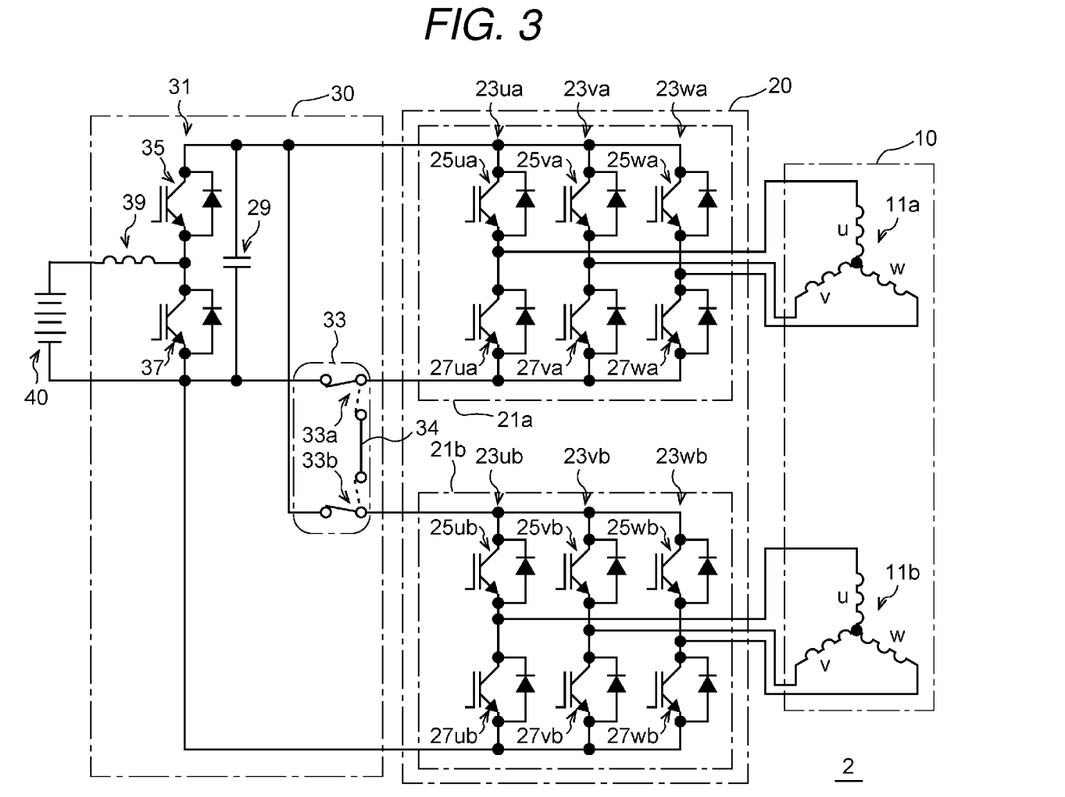
FIG. 3 is a circuit diagram illustrating the configuration example of the vehicle drive system according to the embodiment.

FIGS. 2 and 3 are diagrams illustrating the configuration of the vehicle drive system 2 according to the first embodiment. FIG. 2 is a block diagram schematically illustrating the configuration of the vehicle drive system 2. FIG. 3 is a circuit diagram illustrating the configuration of the vehicle drive system 2.

As illustrated in FIG. 2, the vehicle drive system 2 includes the drive motor 10, the inverter unit 20, the converter unit 30, the battery 40, and the vehicle control device 50. The battery 40 is a secondary battery rechargeable and dischargeable. For example, the battery 40 may be a lithium ion battery with a rated voltage of 200 V. However, the battery 40 is not limited to particular rated voltages and kinds. The battery 40 is coupled to the drive motor 10 via the converter unit 30 and the inverter unit 20, and accumulates power supplied to the drive motor 10. The battery 40 is provided with a battery management device 41 configured to detect data such as an open circuit voltage, an output voltage, a battery temperature of the battery 40 and transmit the data to the vehicle control device 50.

The drive motor 10 outputs the drive torque transmitted to the front wheels 3F via a differential mechanism 7 and the front-wheel drive shaft 5F. Drive of the drive motor 10 is controlled by the vehicle control device 50. In the first embodiment, the double-stator axial gap motor is used as the drive motor 10. The double-stator axial gap motor has an axial gap structure where a rotor 13 is held between a first stator 11a and a second stator 11b spaced from each other and disposed on opposite sides of the rotor 13 in a rotary shaft direction thereof.

In the first embodiment, the drive motor 10 is a three-phase alternating current motor. However, the number of phases is not limited to a particular number. When a three-phase alternating current is supplied to each of the first stator 11a and the second stator 11b, rotary magnetic field is formed to rotate the rotor 13 so that the drive motor 10 outputs the drive torque. While the three-phase alternating current is not supplied to the first stator 11a and the second stator 11b, the rotor 13 is rotated by receiving rotational torque of the front wheels 3F transmitted via the front-wheel drive shaft 5F so that the drive motor 10 performs regenerative power generation.

The inverter unit 20 includes a first inverter circuit 21a and a second inverter circuit 21b. The first inverter circuit 21*a* converts DC power swept from the battery 40 into three-phase AC power and supplies the three-phase AC power to the first stator 11*a* of the drive motor 10. The first inverter circuit 21*a* converts three-phase AC power regeneratively generated by the first stator 11*a* into DC power and supplies the DC power to the converter unit 30. Similarly, the second inverter circuit 21*b* converts DC power swept from the battery 40 into three-phase AC power and supplies the three-phase AC power to the second stator 11*b* of the drive motor 10. The second inverter circuit 21*b* converts three-phase AC power regeneratively generated by the second stator 11*b* into DC power and supplies the DC power to a step-up circuit 31. Drive of the inverter unit 20 is controlled by the vehicle control device 50.

The converter unit 30 includes the step-up circuit 31 and a switch 33. The step-up circuit 31 raises a voltage of power regeneratively generated by the drive motor 10 to a requested charging voltage of the battery 40, and supplies the power to the battery 40. The step-up circuit 31 may raise or lower an output voltage of the battery 40 and supply the output power to the inverter unit 20. The switch 33 switches between series connection and parallel connection of the first inverter circuit 21*a* and the second inverter circuit 21*b* to the step-up circuit 31. Drive of the converter unit 30 is controlled by the vehicle control device 50.

As illustrated in FIG. 3, the first inverter circuit 21*a* and the second inverter circuit 21*b* each include switching elements. Operation of each of the switching elements of the first inverter circuit 21*a* and the second inverter circuit 21*b* is controlled by the vehicle control device 50. The first inverter circuit 21*a* and the second inverter circuit 21*b* have an identical configuration. The configuration of the first inverter circuit 21*a* will be described below whereas describing the configuration of the second inverter circuit 21*b* will be omitted.

The first inverter circuit 21*a* includes three arm circuits 23*ua*, 23*va*, and 23*wa* (hereinafter generally referred to simply as "arm circuits 23*a*" unless specified otherwise). The arm circuit 23*ua* is electrically connected to a u-phase coil of the first stator 11*a* of the drive motor 10. The arm circuit 23*va* is electrically connected to a v-phase coil of the first stator 11*a* of the drive motor 10. The arm circuit 23*wa* is electrically connected to a w-phase coil of the first stator 11*a* of the drive motor 10. Each of the arm circuits 23*a* includes an upper arm electrically connected to a positive electrode side of the battery 40 and a lower arm electrically connected to a negative electrode side of the battery 40.

The upper arm and the lower arm of each of the arm circuits 23*a* are provided with switching elements 25*ua*, 27*ua*, 25*va*, 27*va*, 25*wa*, and 27*wa* where diodes are electrically connected in an antiparallel manner. The switching elements 25*ua*, 27*ua*, 25*va*, 27*va*, 25*wa*, and 27*wa* may be, for example, metal oxide semiconductor field effect transistors (MOSFETs), insulated gate bipolar transistors (IGBTs), or other switching elements.

The u-phase, v-phase, and w-phase coils of the first stator 11*a* of the drive motor 10 are each electrically connected to a connector between the upper arm and the lower arm of each of the arm circuits 23*ua*, 23*va*, and 23*wa*. Operation of the switching elements 25*ua*, 27*ua*, 25*va*, 27*va*, 25*wa*, and 27*wa* of the respective arm circuits 23*ua*, 23*va*, and 23*wa* is controlled by the vehicle control device 50 so as to control rotational drive of the rotor 13 by the first stator 11*a* of the drive motor 10 and regenerative power generation by the first stator 11*a*.

The second inverter circuit 21*b* coupled to the second stator 11*b* has substantially the same configuration as the first inverter circuit 21*a*.

The step-up circuit 31 includes a coil 39, two switching elements 35 and 37, and a smoothing capacitor 29. The step-up circuit 31 includes an upper arm electrically connected to an upper arm side of the first inverter circuit 21*a* and the second inverter circuit 21*b*, and a lower arm electrically connected to a lower arm side of the first inverter circuit 21*a* and the second inverter circuit 21*b*. The upper arm and the lower arm are respectively provided with the switching elements 35 and 37 where diodes are electrically connected in an antiparallel manner. The switching elements 35 and 37 may be, for example, MOSFETs, IGBTs, or other switching elements.

When power of the battery 40 is supplied to the first inverter circuit 21*a* and the second inverter circuit 21*b*, switching control of each of the two switching elements 35 and 37 of the step-up circuit 31 is performed to boost the power of the battery 40, and the boosted power is supplied to the first inverter circuit 21*a* and the second inverter circuit 21*b*. When the battery 40 is charged with regeneratively generated power by the drive motor 10, switching control of each of the two switching elements 35 and 37 of the step-up circuit 31 is performed to boost regeneratively generated power output from the first inverter circuit 21*a* and the second inverter circuit 21*b*, and the boosted power is supplied to the battery 40. Boosting ratios are adjusted by on/off duty ratios of the switching elements 35 and 37. Operation of each of the switching elements 35 and 37 is controlled by the vehicle control device 50.

One end of the coil 39 is electrically connected to the positive electrode side of the battery 40, and the other end of the coil 39 is electrically connected between the two switching elements 35 and 37. The smoothing capacitor 29 and the battery 40 are connected in parallel to each of the first inverter circuit 21*a* and the second inverter circuit 21*b*.

The switch 33 includes a first changeover switch 33*a*, a second changeover switch 33*b*, and a relay line 34. The first changeover switch 33*a* is disposed in an intermediate portion of a path electrically connecting the lower arm of the step-up circuit 31 and the lower arm side of the first inverter circuit 21*a*. The first changeover switch 33*a* is driven by the vehicle control device 50 and switches between a first state (indicated by solid lines) of electrically connecting the lower arm side of the first inverter circuit 21*a* to the lower arm of the step-up circuit 31 and a second state (indicated by dashed lines) of electrically connecting the lower arm side of the first inverter circuit 21*a* to the relay line 34. The second changeover switch 33*b* is disposed in an intermediate portion of a path electrically connecting the upper arm of the step-up circuit 31 and the upper arm side of the second inverter circuit 21*b*. The second changeover switch 33*b* is driven by the vehicle control device 50 and switches between a first state (indicated by solid lines) of electrically connecting the upper arm side of the second inverter circuit 21*b* to the upper arm of the step-up circuit 31 and a second state (indicated by dashed lines) of electrically connecting the upper arm side of the second inverter circuit 21*b* to the relay line 34.

When both of the first changeover switch 33*a* and the second changeover switch 33*b* are in the first state (indicated by solid lines), the first inverter circuit 21*a* and the second inverter circuit 21*b* are connected in parallel to the step-up circuit 31. When both of the first changeover switch 33*a* and the second changeover switch 33*b* are in the second state (indicated by dashed lines), the first inverter circuit 21*a* and the second inverter circuit 21b are connected in series to the step-up circuit 31. The first changeover switch 33a and the second changeover switch 33b are not limited to any particular switches insofar as the vehicle control device 50 operates the switches by energization control.

The vehicle control device 50 includes a controller 51 and a storage 53. The controller 51 includes one or more processors such as a central processing unit (CPU). For example, the controller 51 may be partly or wholly configured with firmware or other updatable matter, or a program module executed by commands from the processors. However, the controller 51 may be partly or wholly configured with hardware.

The storage 53 includes one or more storage elements (memories), such as a random access memory (RAM) and a read only memory (ROM), connected to the controller 51 in a communicable manner. However, the number and kind of storages 53 is not limited to any particular number and kind. The storage 53 stores computer programs executed by the controller 51, and data used for arithmetic processing such as various parameters, detection data, and arithmetic processing results. In addition, the vehicle control device 50 includes an interface configured to communicate with the battery management device 41 and the vehicle state sensor 45, for example.

The controller 51 controls drive of the first inverter circuit 21a, the second inverter circuit 21b, the step-up circuit 31, and the switch 33 so as to drive the drive motor 10. In one example, the controller 51 obtains information of a target acceleration of the vehicle 1. When the target acceleration is a positive value, the controller 51 calculates a target drive torque of the drive motor 10 based on information of a vehicle speed and the target acceleration. The controller 51 turns each of the first changeover switch 33a and the second changeover switch 33b of the switch 33 into the first state, and controls drive of each of the switching elements disposed in the first inverter circuit 21a, the second inverter circuit 21b, and the step-up circuit 31 based on the target drive torque calculated, so as to drive the drive motor 10. Thus, the drive motor 10 outputs the drive torque of the vehicle 1.

When the target acceleration is a negative value, the controller 51 calculates a target regenerative torque of the drive motor 10 based on information of the vehicle speed and the target acceleration. The controller 51 turns each of the first changeover switch 33a and the second changeover switch 33b of the switch 33 into the first state or the second state, and controls drive of each of the switching elements disposed in the first inverter circuit 21a, the second inverter circuit 21b, and the step-up circuit 31 based on the target regenerative torque calculated, so as to cause the drive motor 10 to perform regenerative power generation. Thus, the drive motor 10 performs regenerative power generation and generates a regenerative brake torque. Details of the control process by the controller 51 will be described below.

Figure 4:
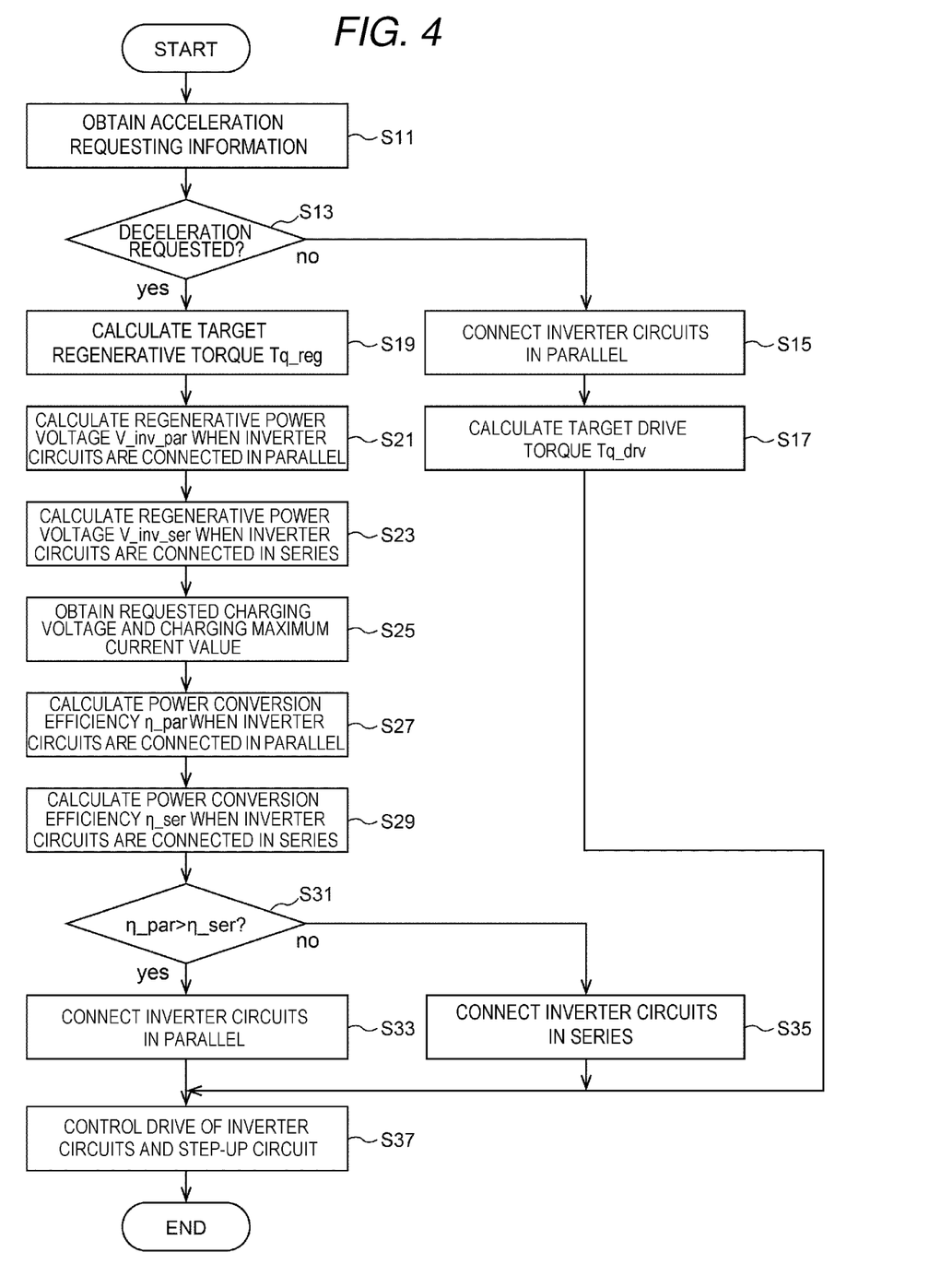
FIG. 4 is a flowchart of an operation example of the vehicle drive system according to the embodiment.

FIG. 4 is a flowchart of an example of arithmetic processing by the vehicle control device 50 of the vehicle drive system 2 according to the first embodiment. The processing illustrated in the flowchart of FIG. 4 is repeated in a predetermined processing cycle.

First, the controller 51 obtains acceleration requesting information of the vehicle 1 (step S11). The acceleration requesting information is detectable based on sensor signals from the accelerator position sensor and the brake stroke sensor, for example. When the accelerator pedal is depressed, the controller 51 determines that the driver is requesting acceleration. When the brake pedal is depressed or when a speed of the accelerator pedal returning in a direction where the operation amount of the accelerator pedal becomes zero exceeds a predetermined threshold, the controller 51 determines that the driver is requesting deceleration. It is noted that when the vehicle 1 is traveling in a self-driving mode, the controller 51 obtains, as the acceleration requesting information, information of a requested acceleration or a requested deceleration calculated by arithmetic processing.

Next, based on the acceleration requesting information obtained, the controller 51 determines whether deceleration of the vehicle 1 is being requested (step S13). Unless it is determined that deceleration is being requested (No at S13), the controller 51 connects the first inverter circuit 21a and the second inverter circuit 21b in parallel (step S15). In one example, the controller 51 turns both of the first changeover switch 33a and the second changeover switch 33b into the first state, and connects the first inverter circuit 21a and the second inverter circuit 21b in parallel to the step-up circuit 31.

Next, based on the information of the vehicle speed and the target acceleration, the controller 51 calculates a target drive torque Tq_drv_tgt output from the drive motor 10 (step S17). The information of the vehicle speed is obtainable based on a sensor signal transmitted from the vehicle speed sensor. The information of the target acceleration is obtainable based on a sensor signal transmitted from the accelerator position sensor. When acceleration is being requested, a target acceleration is a positive value. The target drive torque Tq_drv_tgt is a larger value as the vehicle speed is higher and as the target acceleration is higher.

Next, based on the target drive torque Tq_drv_tgt calculated, the controller 51 controls drive of each of the switching elements of the step-up circuit 31, the first inverter circuit 21a, and the second inverter circuit 21b so as to drive the drive motor 10 (step S37). For example, based on the target drive torque Tq_drv_tgt and the rotational speed of the drive motor 10, the controller 51 sets voltages of direct current supplied to the first inverter circuit 21a and the second inverter circuit 21b, and frequencies of three-phase alternating current supplied to the first stator 11a and the second stator 11b of the drive motor 10. Although a ratio of a drive torque Tq_drv1 of the first stator 11a and a drive torque Tq_drv2 of the second stator 11b is basically 1:1, the ratio of the drive torques may be set as suited. However, when the ratio of the drive torques is 1:1, the voltage of direct current supplied to the first inverter circuit 21a can be made equal to the voltage of direct current supplied to the second inverter circuit 21b, and drive amounts of the switching elements 25a and 27a of the first inverter circuit 21a can be made equal to drive amounts of the switching elements 25b and 27b of the second inverter circuit 21b, thereby reducing a load of the control process.

Based on a ratio of the output voltage of the battery 40 and the voltages of direct current supplied to the first inverter circuit 21a and the second inverter circuit 21b, the controller 51 controls drive of the switching elements 35 and 37 of the step-up circuit 31 and raises a voltage of direct current output from the battery 40 to a preset voltage. The controller 51 controls drive of the switching elements 25a, 27a, 25b, and 27b of the first inverter circuit 21a and the second inverter circuit 21b, converts direct current into three-phase alternating current, and supplies the three-phase alternating current to the first stator 11a and the second stator 11b. Thus, the drive motor 10 is driven to output the drive torque of the vehicle 1. It is noted that arithmetic processing in the case of driving the drive motor 10 is not limited to any particular processing but may be performed by a known arithmetic processing method.

At step S13 above, when it is determined that deceleration is being requested (Yes at S13), the controller 51 calculates a target regenerative torque Tq_reg_tgt of the drive motor 10 based on information of the vehicle speed and the target acceleration (step S19). When deceleration is being requested, a target acceleration is a negative value. The target regenerative torque Tq_reg_tgt is a larger value as the vehicle speed is higher and as the target acceleration is lower (higher on a negative side). It is noted that an upper limit may be set for the target regenerative torque Tq_reg_tgt settable, and that information of a brake torque insufficient for deceleration requesting may be transmitted to the brake hydraulic pressure control device 19 of the hydraulic brake system 16 so that the insufficient brake torque may be compensated with a hydraulic brake torque.

Next, the controller 51 calculates a voltage of regeneratively generated power (hereinafter also referred to as "parallel-connection regenerative power voltage") V_inv_par output to the step-up circuit 31 when the first inverter circuit 21a and the second inverter circuit 21b are connected in parallel (step S21).

Generally, an induction power generation voltage E by electromagnetic induction of a motor including a pair of a stator and a rotor may be represented by the following formula 1:

Formula 1

$$E = -\frac{d\Phi}{dt} = B \times S \times \omega \times \sin\theta \quad (1)$$

Φ: magnetic flux
t: time
B: magnetic flux density
S: coil area
ω: rotor angular velocity
θ: angle made by a direction parallel to a coil surface of the stator and a perpendicular to a direction of the magnetic flux density That is, the regenerative power voltage of the drive motor 10 is proportional to the rotational speed of the drive motor 10, namely, the vehicle speed. Since the magnetic flux density (B) and the coil area (S) in the above formula 1 are information obtainable from a specification of the drive motor 10 in advance, the controller 51 is capable of calculating regenerative power voltages V_inv_reg1 and V_inv_reg2 respectively output from the first inverter circuit 21a and the second inverter circuit 21b based on the vehicle speed.

When the first inverter circuit 21a and the second inverter circuit 21b are connected in parallel, the regenerative power voltage V_inv_reg1 output from the first inverter circuit 21a and the regenerative power voltage V_inv_reg2 output from the second inverter circuit 21b are to be made equal to each other so as to supply regeneratively generated power output from each of the inverter circuits to the step-up circuit 31. For this reason, a ratio of a target regenerative torque Tq_reg_tgt1 of the first stator 11a and a target regenerative torque Tq_reg_tgt2 of the second stator 11b is 1:1. That is, each of the target regenerative torque Tq_reg_tgt1 of the first stator 11a and the target regenerative torque Tq_reg_tgt2 of the second stator 11b is a half of the target regenerative torque Tq_reg_tgt. The parallel-connection regenerative power voltage V_inv_par when the first inverter circuit 21a and the second inverter circuit 21b are connected in parallel is equal to the regenerative power voltage V_inv_reg1, V_inv_reg2 of each of the first stator 11a and the second stator 11b.

Next, the controller 51 calculates a voltage of regeneratively generated power (hereinafter also referred to as "series-connection regenerative power voltage") V_inv_ser output to the step-up circuit 31 when the first inverter circuit 21a and the second inverter circuit 21b are connected in series (step S23). The series-connection regenerative power voltage V_inv_ser when the first inverter circuit 21a and the second inverter circuit 21b are connected in series is the sum of the regenerative power voltage V_inv_reg1 of the first stator 11a and the regenerative power voltage V_inv_reg2 of the second stator 11b. The sum of the regenerative power voltage V_inv_reg1 of the first stator 11a and the regenerative power voltage V_inv_reg2 of the second stator 11b is calculable based on the target regenerative torque Tq_reg_tgt irrespective of the ratio of the target regenerative torque Tq_reg_tgt1 of the first stator 11a and the target regenerative torque Tq_reg_tgt2 of the second stator 11b.

In one example, the ratio of the regenerative power voltage V_inv_reg1 of the first stator 11a and the regenerative power voltage V_inv_reg2 of the second stator 11b is equal to the ratio of the target regenerative torque Tq_reg_tgt1 of the first stator 11a and the target regenerative torque Tq_reg_tgt2 of the second stator 11b. When the first inverter circuit 21a and the second inverter circuit 21b are connected in series, the rotor 13 has a common rotational speed, and the ratio of the target regenerative torque Tq_reg_tgt1 of the first stator 11a and the target regenerative torque Tq_reg_tgt2 of the second stator 11b is adjusted in such a manner that the ratio of the regenerative power voltage V_inv_reg1 of the first stator 11a and the regenerative power voltage V_inv_reg2 of the second stator 11b can be adjusted. In this case, irrespective of this ratio, the sum of the regenerative power voltage V_inv_reg1 of the first stator 11a and the regenerative power voltage V_inv_reg2 of the second stator 11b (equal to the series-connection regenerative power voltage V_inv_ser) has a substantially constant value. The ratio of the target regenerative torques Tq_reg_tgt1 and Tq_reg_tgt2 may be set as suited. However, when the ratio is 1:1, the switching elements 25a and 27a of the first inverter circuit 21a and the switching elements 25b and 27b of the second inverter circuit 21b can be driven by the same drive amount, thereby reducing the load of the control process.

Next, the controller 51 obtains information of a requested charging voltage V_bat_crg of the battery 40 and information of a charging maximum current value (step S25). The information of the requested charging voltage V_bat_crg of the battery 40 and the information of the charging maximum current value are preset in accordance with a specification of the battery 40 and stored in the storage 53.

Next, the controller 51 calculates a power conversion efficiency (hereinafter also referred to as "parallel-connection power conversion efficiency") η_par when the first inverter circuit 21a and the second inverter circuit 21b are connected in parallel (step S27). In one example, the controller 51 calculates the parallel-connection power conversion efficiency η_par based on the parallel-connection regenerative power voltage V_inv_par calculated at step S21 and the requested charging voltage V_bat_crg. As already described, in accordance with the drive duty ratio of switching on and off the switching elements 35 and 37 of the step-up circuit 31, the power conversion efficiency decreases as a period of time of switching on the switching elements 35 and 37 increases. The drive duty ratio of the switching elements 35 and 37 is set in accordance with a boosting ratio of raising the parallel-connection regenerative power voltage V_inv_par to the requested charging voltage V_bat_crg. Therefore, referring to set data of a relationship between the boosting ratio and the power conversion efficiency stored in the storage 53 in advance, the controller 51 can calculate the parallel-connection power conversion efficiency η_par.

Next, the controller 51 calculates a power conversion efficiency (hereinafter also referred to as "series-connection power conversion efficiency") η_ser when the first inverter circuit 21a and the second inverter circuit 21b are connected in series (step S29). In one example, the controller 51 calculates the series-connection power conversion efficiency η_ser based on the series-connection regenerative power voltage V_inv_ser calculated at step S23 and the requested charging voltage V_bat_crg. In a manner similar to the parallel-connection power conversion efficiency η_par, the controller 51 can calculate the series-connection power conversion efficiency η_ser by referring to data stored in the storage 53 in advance.

Next, the controller 51 determines whether the parallel-connection power conversion efficiency η_par is higher than the series-connection power conversion efficiency η_ser (step S31) When the parallel-connection power conversion efficiency η_par is higher than the series-connection power conversion efficiency η_ser (Yes at S31), the controller 51 keeps both of the first changeover switch 33a and the second changeover switch 33b in the first state, and connects the first inverter circuit 21a and the second inverter circuit 21b in parallel to the step-up circuit 31 (step S33).

Next, based on the target regenerative torque Tq_reg_tgt calculated, the controller 51 controls drive of each of the switching elements of the step-up circuit 31, the first inverter circuit 21a, and the second inverter circuit 21b so as to cause the drive motor 10 to perform regenerative power generation (step S37). For example, based on the respective target regenerative torques Tq_reg_tgt1 and Tq_reg_tgt2 of the first stator 11a and the second stator 11b, and the rotational speed of the drive motor 10, the controller 51 sets the on/off frequency of each of the switching elements 25a, 27a, 25b, and 27b of the first inverter circuit 21a and the second inverter circuit 21b. The controller 51 sets the on/off drive duty ratio of the switching elements 35 and 37 of the step-up circuit 31 based on a ratio of the parallel-connection regenerative power voltage V_inv_par and the requested charging voltage V_bat_crg. The controller 51 controls drive of the switching elements 25a, 27a, 25b, 27b, 35, and 37 of the first inverter circuit 21a, the second inverter circuit 21b, and the step-up circuit 31, converts three-phase AC regenerative power current into direct current, boosts the direct current to the requested charging voltage of the battery 40, and thus charges the battery 40.

When the parallel-connection power conversion efficiency η_par is equal to or less than the series-connection power conversion efficiency η_ser (No at S31), the controller 51 keeps both of the first changeover switch 33a and the second changeover switch 33b in the second state, and connects the first inverter circuit 21a and the second inverter circuit 21b in series to the step-up circuit 31 (step S35).

Next, based on the target regenerative torque Tq_reg_tgt calculated, the controller 51 controls drive of each of the switching elements of the step-up circuit 31, the first inverter circuit 21a, and the second inverter circuit 21b so as to cause the drive motor 10 to perform regenerative power generation (step S37). For example, based on the respective target regenerative torques Tq_reg_tgt1 and Tq_reg_tgt2 of the first stator 11a and the second stator 11b, and the rotational speed of the drive motor 10, the controller 51 sets the on/off frequency of each of the switching elements 25a, 27a, 25b, and 27b of the first inverter circuit 21a and the second inverter circuit 21b. In the case of the axial gap drive motor 10, because the switching elements 25a and 27a of the first inverter circuit 21a and the switching elements 25b and 27b of the second inverter circuit 21b can be driven by the same drive amount, the ratio of the target regenerative torques Tq_reg_tgt1 and Tq_reg_tgt2 of the first stator 11a and the second stator 11b is suitably 1:1.

The controller 51 sets the on/off drive duty ratio of the switching elements 35 and 37 of the step-up circuit 31 based on a ratio of the series-connection regenerative power voltage V_inv_ser and the requested charging voltage V_bat_crg. The controller 51 controls drive of the switching elements 25a, 27a, 25b, 27b, 35, and 37 of the first inverter circuit 21a, the second inverter circuit 21b, and the step-up circuit 31, converts three-phase AC regenerative power current into direct current, boosts the direct current to the requested charging voltage of the battery 40, and thus charges the battery 40.

In the above-described manner, when acceleration of the vehicle 1 is being requested, the vehicle control device 50 connects the first inverter circuit 21a and the second inverter circuit 21b in parallel and supplies power to the first stator 11a and the second stator 11b, thereby causing the drive motor 10 to output the drive torque. When deceleration of the vehicle 1 is being requested, the vehicle control device 50 compares the parallel-connection power conversion efficiency η_par when the first inverter circuit 21a and the second inverter circuit 21b are connected in parallel, with the series-connection power conversion efficiency η_ser when the first inverter circuit 21a and the second inverter circuit 21b are connected in series, and the vehicle control device 50 switches between parallel connection and series connection of the first inverter circuit 21a and the second inverter circuit 21b so as to increase the power conversion efficiency. Consequently, when the regeneratively generated power is boosted by the step-up circuit 31 so as to charge the battery 40, regenerative power efficiency can be prevented from decreasing.

It is noted that the vehicle 1 where the vehicle drive system 2 according to the first embodiment is applicable is not limited to the electric vehicle including the single drive motor 10 configured to drive the front wheels. For example, the vehicle 1 may be two-wheel drive electric vehicle including a single axial gap drive motor configured to drive the rear wheels.

Alternatively, the vehicle 1 may be a four-wheel drive electric vehicle including the axial gap drive motor configured to drive the rear wheels as well as the axial gap drive motor configured to drive the front wheels, or the vehicle 1 may be a four-wheel drive electric vehicle including the axial gap drive motors corresponding to the respective wheels 3. In this case, two stators of each of the axial gap drive motors are each provided with a first inverter circuit and a second inverter circuit, and each of the drive motors undergoes the above-described process for switching between connection states of the inverter circuits. Target regenerative torques for the drive motors are values of a requested brake torque distributed at a suitable ratio.

Next, a vehicle drive system according to a second embodiment of the disclosure will be described. The vehicle drive system according to the second embodiment includes a front-wheel drive motor configured to drive front wheels and a rear-wheel drive motor configured to drive rear wheels. In the second embodiment, as the front-wheel drive motor and the rear-wheel drive motor, a three-phase alternating current drive motor including a single rotor and a single stator is employed. Hereinafter, a description will be given on the vehicle drive system according to the second embodiment, mainly focusing on a difference from the vehicle drive system according to the first embodiment.

First, a description will be given on an example of general arrangement of a vehicle where the vehicle drive system according to the second embodiment of the disclosure is applied.

Figure 5:
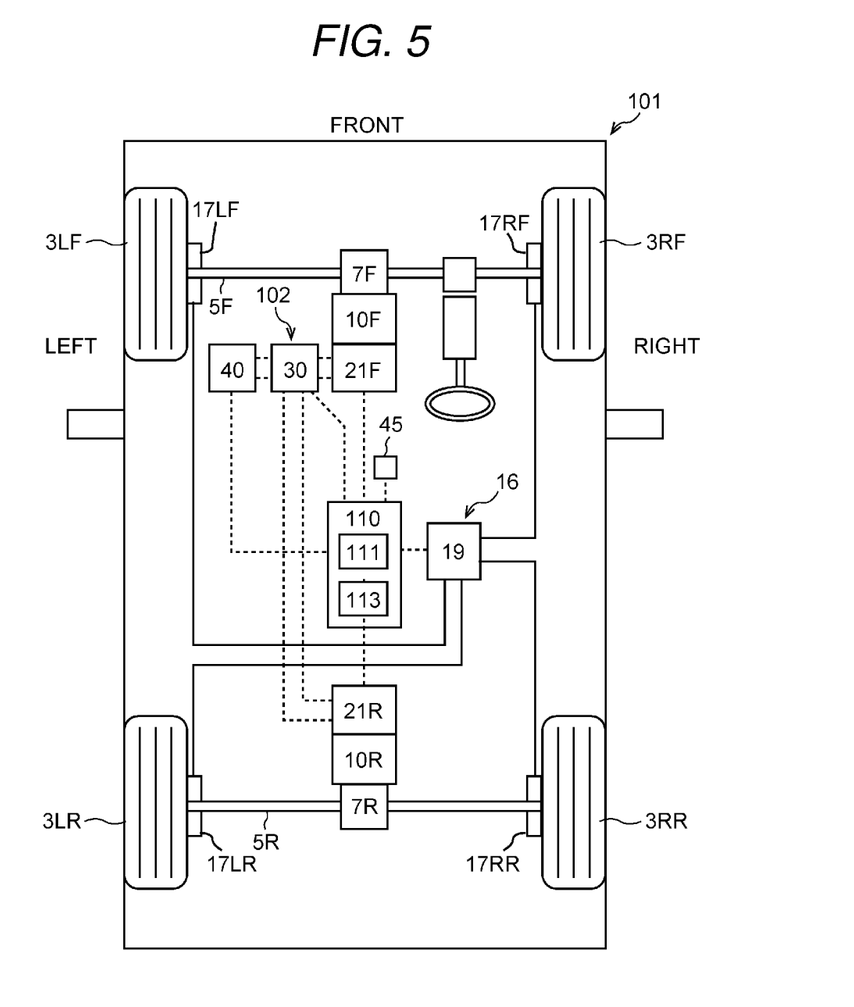
FIG. 5 is a schematic diagram illustrating a configuration example of a vehicle where a vehicle drive system according to an embodiment of the disclosure is applicable.

FIG. 5 is a schematic diagram illustrating a configuration example of a vehicle 101 where a vehicle drive system 102 according to the second embodiment is applied. The vehicle 101 illustrated in FIG. 5 is a four-wheel drive electric vehicle where drive torque output from a front-wheel drive motor 10F is transmitted to the left front wheel 3LF and the right front wheel 3RF, and drive torque output from a rear-wheel drive motor 10R is transmitted to the left rear wheel 3LR and the right rear wheel 3RR (hereinafter generally referred to as "rear wheels 3R" unless specified otherwise).

The vehicle 101 includes the vehicle drive system 102 and the hydraulic brake system 16. The hydraulic brake system 16 has substantially the same configuration as the hydraulic brake system 16 of the vehicle 1 described in the first embodiment. The vehicle drive system 102 according to the second embodiment includes the front-wheel drive motor 10F, the rear-wheel drive motor 10R, a first inverter circuit 21F, a second inverter circuit 21R, the converter unit 30, the battery 40, and a vehicle control device 110.

Figure 6:
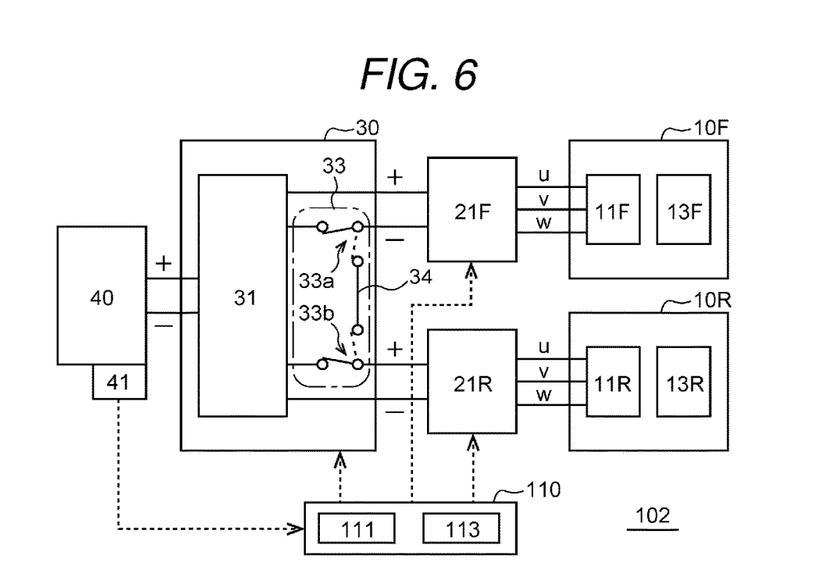
FIG. 6 is a block diagram illustrating a configuration example of the vehicle drive system according to the embodiment.
Figure 7:
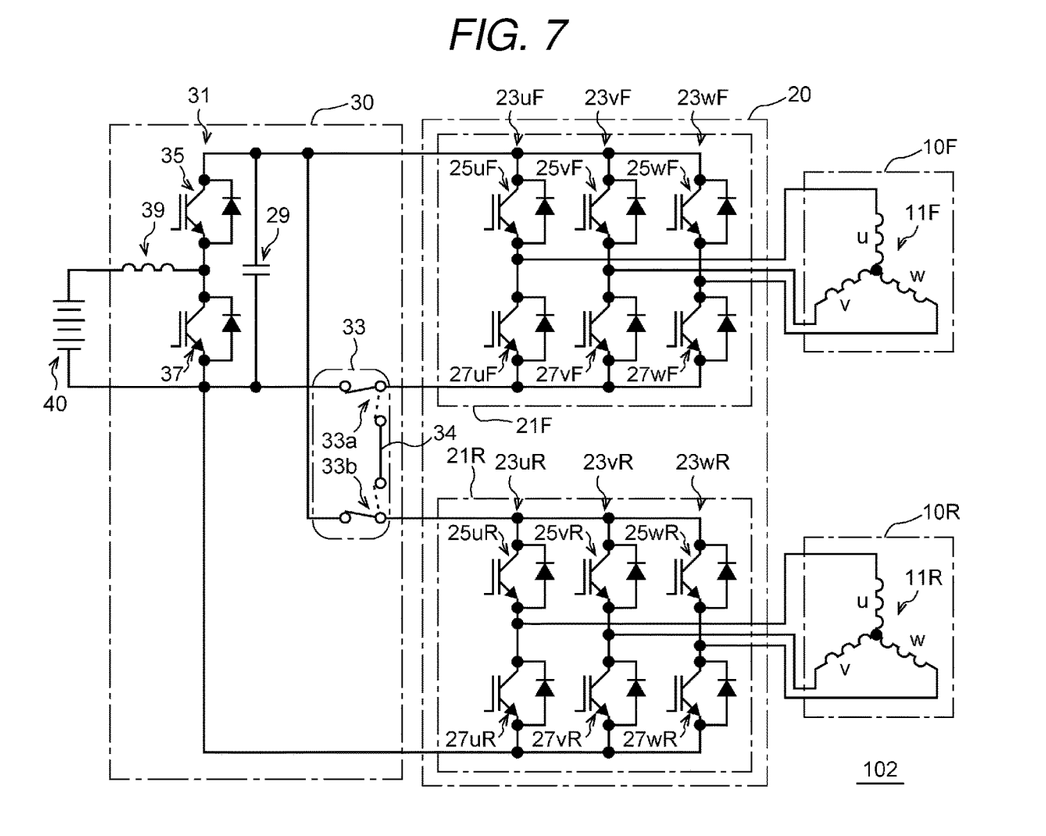
FIG. 7 is a circuit diagram illustrating the configuration example of the vehicle drive system according to the embodiment.

FIGS. 6 and 7 are diagrams illustrating a configuration of the vehicle drive system 102 according to the second embodiment. FIG. 6 is a block diagram schematically illustrating the configuration of the vehicle drive system 102. FIG. 7 is a circuit diagram illustrating the configuration of the vehicle drive system 102. The battery 40 and the converter unit 30 have substantially the same configurations as the battery 40 and the converter unit 30 of the vehicle drive system 2 according to the first embodiment.

In the second embodiment, the front-wheel drive motor 10F outputs the drive torque transmitted to the front wheels 3F via a front-wheel differential mechanism 7F and the front-wheel drive shaft 5F. Moreover, the rear-wheel drive motor 10R outputs the drive torque transmitted to the rear wheels 3R via a rear-wheel differential mechanism 7R and the rear-wheel drive shaft 5R. Drive of the front-wheel drive motor 10F and the rear-wheel drive motor 10R is controlled by the vehicle control device 110. As described above, in the second embodiment, as the front-wheel drive motor 10F and the rear-wheel drive motor 10R, a three-phase alternating current drive motor including a single stator 11F, 11R and a single rotor 13F, 13R is employed. The front-wheel drive motor 10F and the rear-wheel drive motor 10R may have a radial structure where the rotor and the stator are spaced from each other in a radial direction, or may have an axial gap structure where the rotor and the stator are spaced from each other in the axial direction.

The first inverter circuit 21F converts DC power swept from the battery 40 into three-phase AC power and supplies the three-phase AC power to the first stator 11F of the front-wheel drive motor 10F. The first inverter circuit 21F converts three-phase AC power regeneratively generated by the front-wheel drive motor 10F into DC power and supplies the DC power to the converter unit 30. Similarly, the second inverter circuit 21R converts DC power swept from the battery 40 into three-phase AC power and supplies the three-phase AC power to the second stator 11R of the rear-wheel drive motor 10R. The second inverter circuit 21R converts three-phase AC power regeneratively generated by the rear-wheel drive motor 10R into DC power and supplies the DC power to the converter unit 30. The first inverter circuit 21F and the second inverter circuit 21R have substantially the same configurations as the first inverter circuit 21a and the second inverter circuit 21b of the vehicle drive system 2 according to the first embodiment. Drive of the first inverter circuit 21F and the second inverter circuit 21R is controlled by the vehicle control device 110.

In a manner similar to the vehicle control device 50 according to the first embodiment, the vehicle control device 110 includes a controller 111 and a storage 113. The controller 111 controls drive of the first inverter circuit 21F, the second inverter circuit 21R, the step-up circuit 31, and the switch 33 so as to drive the front-wheel drive motor 10F and the rear-wheel drive motor 10R. In one example, the controller 111 obtains information of a target acceleration of the vehicle 101. When the target acceleration is a positive value, the controller 111 calculates target drive torques of the front-wheel drive motor 10F and the rear-wheel drive motor 10R based on information of the vehicle speed and the target acceleration. The controller 111 turns each of the first changeover switch 33a and the second changeover switch 33b of the switch 33 into the first state, and controls drive of each of the switching elements disposed in the first inverter circuit 21F, the second inverter circuit 21R, and the step-up circuit 31 based on the target drive torque calculated, so as to drive the front-wheel drive motor 10F and the rear-wheel drive motor 10R. Thus, the front-wheel drive motor 10F and the rear-wheel drive motor 10R each output the vehicle drive torque.

When the target acceleration is a negative value, the controller 111 calculates target regenerative torques of the front-wheel drive motor 10F and the rear-wheel drive motor 10R based on information of the vehicle speed and the target acceleration. The controller 111 turns each of the first changeover switch 33a and the second changeover switch 33b of the switch 33 into the first state or the second state, and controls drive of each of the switching elements disposed in the first inverter circuit 21F, the second inverter circuit 21R, and the step-up circuit 31 based on the target regenerative torques calculated, so as to cause the front-wheel drive motor 10F and the rear-wheel drive motor 10R to perform regenerative power generation. Thus, the front-wheel drive motor 10F and the rear-wheel drive motor 10R each perform regenerative power generation and generate a regenerative brake torque. Details of the control process by the controller 111 will be described below.

Figure 8:
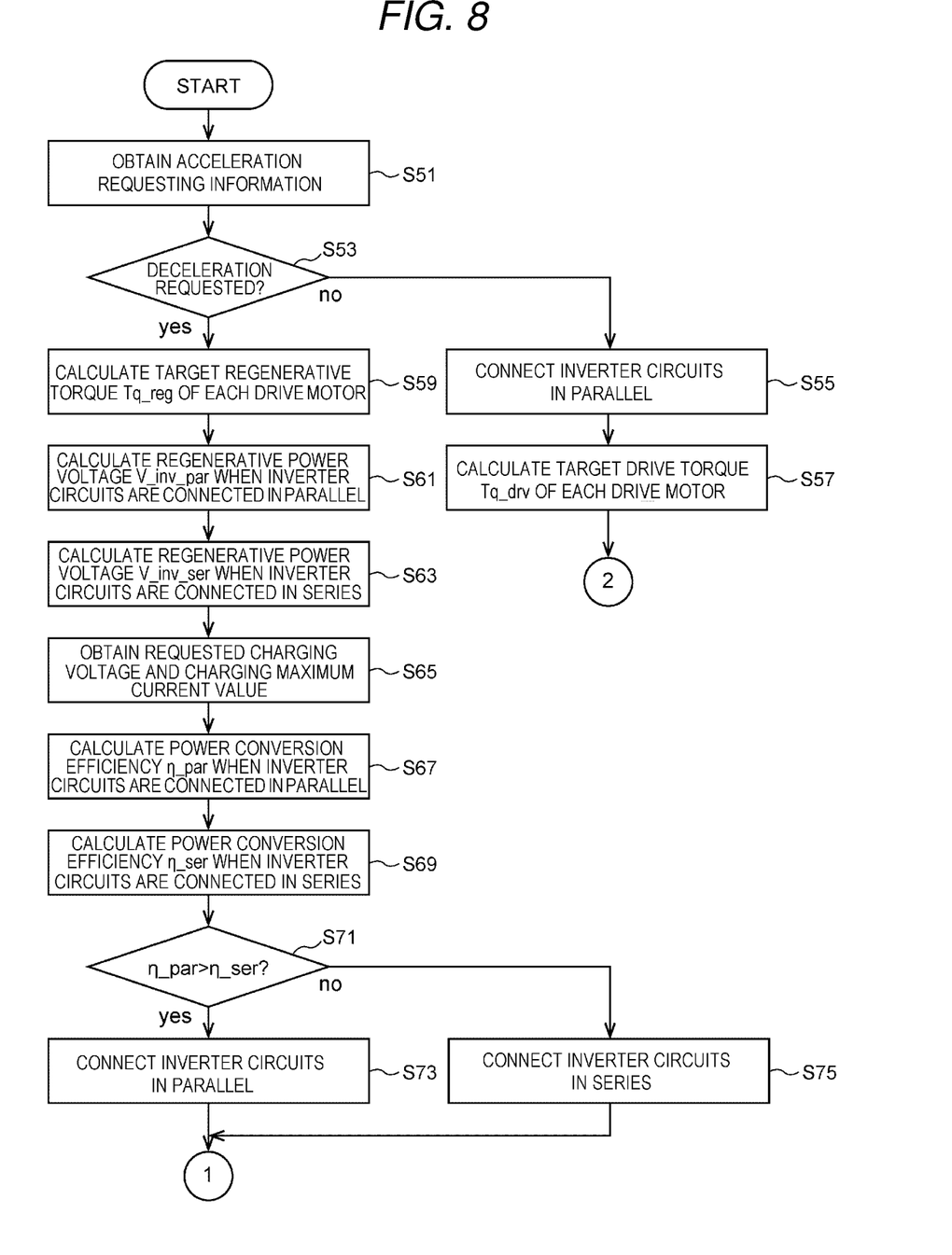
FIG. 8 is a flowchart of an operation example of the vehicle drive system according to the embodiment.
Figure 9:
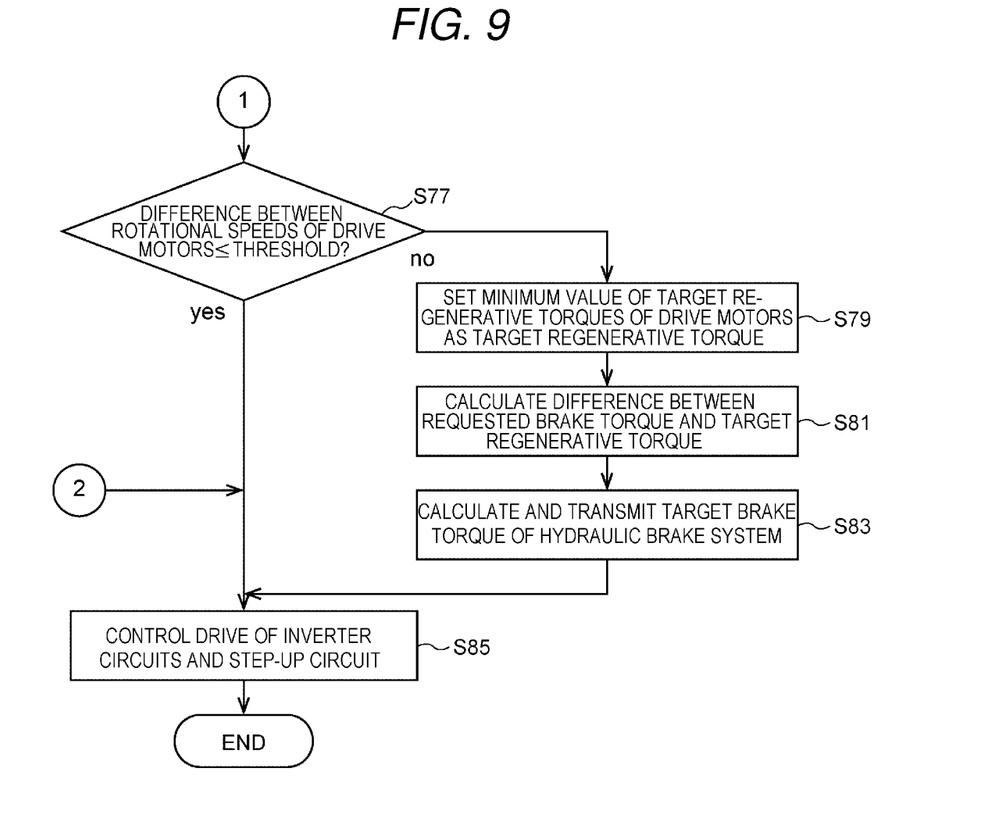
FIG. 9 is a flowchart of the operation example of the vehicle drive system according to the embodiment.

FIGS. 8 and 9 are flowcharts of an example of arithmetic processing by the vehicle control device 110 of the vehicle drive system 102 according to the second embodiment. The processing illustrated in the flowcharts of FIGS. 8 and 9 is repeated in a predetermined processing cycle.

First, the controller 111 obtains acceleration requesting information of the vehicle 101 (step S51). Next, based on the acceleration requesting information obtained, the controller 111 determines whether deceleration of the vehicle 101 is being requested (step S53). Unless it is determined that deceleration is being requested (No at S53), the controller 111 connects the first inverter circuit 21F and the second inverter circuit 21R in parallel (step S55). Next, based on information of a vehicle state and a target acceleration, the controller 111 calculates a target drive torque Tq_drv_tgtF output from the front-wheel drive motor 10F and a target drive torque Tq_drv_tgtR output from the rear-wheel drive motor 10R (step S57). The target drive torques Tq_drv_tgtF and Tq_drv_tgtR for the drive motors are values of a requested drive torque distributed at a suitable ratio. Next, based on the target drive torques Tq_drv_tgtF and Tq_drv_tgtR calculated, the controller 111 controls drive of each of the switching elements of the step-up circuit 31, the first inverter circuit 21F, and the second inverter circuit 21R so as to drive the front-wheel drive motor 10F and the rear-wheel drive motor 10R (step S85).

The processing of step S51 to step S57 and step S85 of causing the front-wheel drive motor 10F and the rear-wheel drive motor 10R to output the drive torques described so far is performed in substantially the same manner as the arithmetic processing of step S11 to step S17 and step S37 described in the first embodiment. It is noted that the ratio of the drive torque of the front-wheel drive motor 10F and the drive torque of the rear-wheel drive motor 10R may be adjusted as suited.

At step S53 above, when it is determined that deceleration is being requested (Yes at S53), the controller 111 calculates a target regenerative torque Tq_reg_tgtF of the front-wheel drive motor 10F and a target regenerative torque Tq_reg_tgtR of the rear-wheel drive motor 10R based on information of the vehicle speed and the target acceleration (step S59). The target regenerative torques Tq_reg_tgtF and Tq_reg_tgtR for the drive motors are values of a requested regenerative torque distributed at a suitable ratio.

Next, the controller 111 calculates a voltage of regeneratively generated power (parallel-connection regenerative power voltage) V_inv_par output to the step-up circuit 31 when the first inverter circuit 21F and the second inverter circuit 21R are connected in parallel (step S61). The controller 111 is capable of calculating regenerative power voltages V_inv_reg1 and V_inv_reg2 respectively output from the first inverter circuit 21F and the second inverter circuit 21R based on the vehicle speed. At this step, supposing that no slippage of the wheels 3 occurs, the regenerative power voltages V_inv_reg1 and V_inv_reg2 are made equal to each other.

Next, the controller 111 calculates a voltage of regeneratively generated power (series-connection regenerative power voltage) V_inv_ser output to the step-up circuit 31 when the first inverter circuit 21F and the second inverter circuit 21R are connected in series (step S63). The series-connection regenerative power voltage V_inv_ser when the first inverter circuit 21F and the second inverter circuit 21R are connected in series is the sum of a regenerative power voltage V_inv_regF of the front-wheel drive motor 10F and a regenerative power voltage V_inv_regR of the rear-wheel drive motor 10R.

Next, the controller 111 obtains information of a requested charging voltage V_bat_crg of the battery 40 and information of a charging maximum current value from the storage 113 (step S65). Subsequently, the controller 111 calculates the parallel-connection power conversion efficiency η_par when the first inverter circuit 21F and the second inverter circuit 21R are connected in parallel based on the parallel-connection regenerative power voltage V_inv_par calculated at step S61 and the requested charging voltage V_bat_crg (step S67). Subsequently, the controller 111 calculates the series-connection power conversion efficiency η_ser when the first inverter circuit 21F and the second inverter circuit 21R are connected in series based on the series-connection regenerative power voltage V_inv_ser calculated at step S63 and the requested charging voltage V_bat_crg (step S69).

Next, the controller 111 determines whether the parallel-connection power conversion efficiency η_par is higher than the series-connection power conversion efficiency η_ser (step S71) When the parallel-connection power conversion efficiency η_par is higher than the series-connection power conversion efficiency η_ser (Yes at S71), the controller 111 keeps both of the first changeover switch 33a and the second changeover switch 33b in the first state, and connects the first inverter circuit 21F and the second inverter circuit 21R in parallel to the step-up circuit 31 (step S73). When the parallel-connection power conversion efficiency η_par is equal to or less than the series-connection power conversion efficiency η_ser (No at S71), the controller 111 keeps both of the first changeover switch 33a and the second changeover switch 33b in the second state, and connects the first inverter circuit 21F and the second inverter circuit 21R in series to the step-up circuit 31 (step S75).

Next, the controller 111 determines whether a difference between a rotational speed Nm_F of the front-wheel drive motor 10F and a rotational speed Nm_R of the rear-wheel drive motor 10R is equal to or less than a predetermined threshold (step S77). The rotational speed Nm_F of the front-wheel drive motor 10F may be detected by a sensor configured to detect a rotational speed of a motor shaft or may be calculated based on a rotational speed of the front-wheel drive shaft 5F detected by a sensor configured to detect the rotational speed of the front-wheel drive shaft 5F. Similarly, the rotational speed Nm_R of the rear-wheel drive motor 10R may be detected by a sensor configured to detect a rotational speed of a motor shaft or may be calculated based on a rotational speed of the rear-wheel drive shaft 5R detected by a sensor configured to detect the rotational speed of the rear-wheel drive shaft 5R. The predetermined threshold is set at such a suitable value that a voltage difference in regeneratively generated powers by the front-wheel drive motor 10F and the rear-wheel drive motor 10R falls within a predetermined range.

When the difference between the rotational speed Nm_F of the front-wheel drive motor 10F and the rotational speed Nm_R of the rear-wheel drive motor 10R is equal to or less than the predetermined threshold (Yes at S77), the controller 111 controls drive of each of the switching elements of the step-up circuit 31, the first inverter circuit 21F, and the second inverter circuit 21R based on the target regenerative torques Tq_reg_tgtF and Tq_reg_tgtR calculated, so as to cause the front-wheel drive motor 10F and the rear-wheel drive motor 10R to perform regenerative power generation (step S85). For example, based on the respective target regenerative torques Tq_reg_tgtF and Tq_reg_tgtR of the front-wheel drive motor 10F and the rear-wheel drive motor 10R, and the rotational speeds of the front-wheel drive motor 10F and the rear-wheel drive motor 10R, the controller 111 sets the on/off frequency of each of switching elements 25F, 27F, 25R, and 27R of the first inverter circuit 21F and the second inverter circuit 21R. The controller 111 sets the on/off drive duty ratio of the switching elements 35 and 37 of the step-up circuit 31 based on a ratio of the parallel-connection regenerative power voltage V_inv_par or the series-connection regenerative power voltage V_inv_ser and the requested charging voltage V_bat_crg. The controller 111 controls drive of the switching elements 25F, 27F, 25R, 27R, 35, and 37 of the first inverter circuit 21F, the second inverter circuit 21R, and the step-up circuit 31, converts three-phase AC regenerative power current into direct current, and boosts the power to the requested charging voltage of the battery 40, thus charging the battery 40.

When the difference between the rotational speed Nm_F of the front-wheel drive motor 10F and the rotational speed Nm_R of the rear-wheel drive motor 10R exceeds the predetermined threshold (No at S77), the controller 111 compares the target regenerative torque Tq_reg_tgtF of the front-wheel drive motor 10F with the target regenerative torque Tq_reg_tgtR of the rear-wheel drive motor 10R, and selects the smaller target regenerative torque as the target regenerative torques Tq_reg_tgtF and Tq_reg_tgtR of the front-wheel drive motor 10F and the rear-wheel drive motor 10R (step S79).

Next, the controller 111 calculates a difference of the target regenerative torque (Tq_reg_tgtF or Tq_reg_tgtR) from the requested brake torque (step S81). In one example, concerning the drive motor having the target regenerative torque decreased at step S79, the controller 111 calculates a difference (ΔTq_F or ΔTq_R) of the target regenerative torque (Tq_reg_tgtF or Tq_reg_tgtR) of the front-wheel drive motor 10F or the rear-wheel drive motor 10R from the requested brake torque to the front wheels 3F or the rear wheels 3R. Based on the torque difference (ΔTq_F or ΔTq_R) calculated, the controller 111 calculates a target brake torque of the hydraulic brake system 16 and transmits the target brake torque to the brake hydraulic pressure control device 19 (step S83). At this step, the target brake torque is calculated to compensate for the target regenerative torque (Tq_reg_tgtF or Tq_reg_tgtR) decreased at step S79.

Next, based on the target regenerative torques Tq_reg_tgtF and Tq_reg_tgtR set at step S79, the controller 111 controls drive of each of the switching elements of the step-up circuit 31, the first inverter circuit 21F, and the second inverter circuit 21R so as to cause the front-wheel drive motor 10F and the rear-wheel drive motor 10R to perform regenerative power generation (step S85). The controller 111 controls drive of the switching elements 25F, 27F, 25R, 27R, 35, and 37 of the first inverter circuit 21F, the second inverter circuit 21R, and the step-up circuit 31, converts three-phase AC regenerative power current into direct current, and boosts the power to the requested charging voltage of the battery 40, thus charging the battery 40.

In the above-described manner, when acceleration of the vehicle 101 is being requested, the vehicle control device 110 connects the first inverter circuit 21F and the second inverter circuit 21R in parallel and supplies power to the front-wheel drive motor 10F and the rear-wheel drive motor 10R, thereby causing the front-wheel drive motor 10F and the rear-wheel drive motor 10R to output the drive torque. When deceleration of the vehicle 101 is being requested, the vehicle control device 110 compares the parallel-connection power conversion efficiency η_par when the first inverter circuit 21F and the second inverter circuit 21R are connected in parallel, with the series-connection power conversion efficiency η_ser when the first inverter circuit 21F and the second inverter circuit 21R are connected in series, and the vehicle control device 110 switches between parallel connection and series connection of the first inverter circuit 21F and the second inverter circuit 21R so as to increase the power conversion efficiency. Consequently, when the regeneratively generated power is boosted by the step-up circuit 31 so as to charge the battery 40, regenerative power efficiency can be prevented from decreasing.

In the second embodiment, when the difference between the rotational speed of the front wheels 3F and the rotational speed of the rear wheels 3R exceeds the predetermined threshold, the smaller target regenerative torque is set as the target regenerative torques of the front-wheel drive motor 10F and the rear-wheel drive motor 10R, and insufficiency from the requested brake torque is set as the target brake torque of the hydraulic brake system 16 and transmitted to the brake hydraulic pressure control device 19. Consequently, slippage of the front wheels 3F or the rear wheels 3R can be prevented from occurring, and at the same time, the requested brake torque can be attained.

It is noted that the vehicle 101 where the vehicle drive system 102 according to the second embodiment is applicable is not limited to the electric vehicle including the front-wheel drive motor 10F and the rear-wheel drive motor 10R. For example, the vehicle 101 may be a four-wheel drive electric vehicle including a drive motor such as an in-wheel motor corresponding to each of the wheels 3. In this case, inverter circuits are provided for each of the drive motors provided for any two or more of the wheels 3, namely, the left front wheel 3LF, the right front wheel 3RF, the left rear wheel 3LR, and the right rear wheel 3RR, and the process for switching between connection states of each of the inverter circuits is performed. Target regenerative torques for the drive motors are values of a requested brake torque distributed at a suitable ratio.

The embodiments of the disclosure have been described heretofore with reference to the accompanying drawings. However, the disclosure is not limited to such embodiments. It will be apparent to those normally skilled in the art where the disclosure pertains that various changes and modifications to the embodiments can be conceived within the technical scope of the appended claims, and it is to be understood that such changes and modifications also naturally belong to the technical scope of the disclosure.

The invention claimed is:

1. A vehicle drive system comprising:
   a battery;
   at least one drive motor;
   inverter circuits configured to drive the at least one drive motor;
   a step-up circuit connected between the battery and the inverter circuits; and
   a switch configured to switch a connection state of the inverter circuits to the step-up circuit between series connection and parallel connection, wherein the connection state is switched between series connection and parallel connection at least partly based on a comparison of a parallel-connection power conversion efficiency and a series-connection power conversion efficiency.

2. The vehicle drive system according to claim 1,
   wherein the at least one drive motor comprises multiple drive motors, and
   wherein the inverter circuits are configured to respectively drive the multiple drive motors.

3. The vehicle drive system according to claim 1,
   wherein the at least one drive motor is a double-stator axial gap motor comprising two stators, and
   wherein the inverter circuits comprise two inverter circuits configured to respectively drive the two stators.

4. The vehicle drive system according to claim 1, further comprising a controller configured to control the switch, wherein the controller is configured to
   connect, in a case where at least power of the battery is supplied to the at least one drive motor, the step-up circuit to the inverter circuits in parallel, and
   connect, in a case where the battery is charged with regeneratively generated power of the at least one drive motor and the parallel-connection power conversion efficiency is equal to or less than the series-connection power conversion efficiency, the step-up circuit to the inverter circuits in series.

5. The vehicle drive system according to claim 2, further comprising a controller configured to control the switch, wherein the controller is configured to
- connect, in a case where at least power of the battery is supplied to the at least one drive motor, the step-up circuit to the inverter circuits in parallel, and
- connect, in a case where the battery is charged with regeneratively generated power of the at least one drive motor and the parallel-connection power conversion efficiency is equal to or less than the series-connection power conversion efficiency, the step-up circuit to the inverter circuits in series.

6. The vehicle drive system according to claim 3, further comprising a controller configured to control the switch, wherein the controller is configured to
- connect, in a case where at least power of the battery is supplied to the at least one drive motor, the step-up circuit to the inverter circuits in parallel, and
- connect, in a case where the battery is charged with regeneratively generated power of the at least one drive motor and the parallel-connection power conversion efficiency is equal to or less than the series-connection power conversion efficiency, the step-up circuit to the inverter circuits in series.

7. The vehicle drive system according to claim 4, wherein the controller is configured to connect the step-up circuit to the inverter circuits in series, in the case where the battery is charged with regeneratively generated power of the at least one drive motor, and a sum of regenerative power voltages of the inverter circuits is less than a charging voltage of the battery.

8. The vehicle drive system according to claim 5, wherein the controller is configured to connect the step-up circuit to the inverter circuits in series, in the case where the battery is charged with regeneratively generated power of the at least one drive motor, and a sum of regenerative power voltages of the inverter circuits is less than a charging voltage of the battery.

9. The vehicle drive system according to claim 6, wherein the controller is configured to connect the step-up circuit to the inverter circuits in series, in the case where the battery is charged with regeneratively generated power of the at least one drive motor, and a sum of regenerative power voltages of the inverter circuits is less than a charging voltage of the battery.

10. The vehicle drive system according to claim 1, further comprising a controller configured to control the switch, wherein the controller is configured to
- connect, in a case where at least power of the battery is supplied to the at least one drive motor, the step-up circuit to the inverter circuits in parallel, and
- connect, in a case where the battery is charged with regeneratively generated power of the at least one drive motor and the parallel-connection power conversion efficiency is higher than the series-connection power conversion efficiency, the step-up circuit to the inverter circuits in series.

11. The vehicle drive system according to claim 2, further comprising a controller configured to control the switch, wherein the controller is configured to
- connect, in a case where at least power of the battery is supplied to the at least one drive motor, the step-up circuit to the inverter circuits in parallel, and
- connect, in a case where the battery is charged with regeneratively generated power of the at least one drive motor and the parallel-connection power conversion efficiency is higher than the series-connection power conversion efficiency, the step-up circuit to the inverter circuits in series.

12. The vehicle drive system according to claim 3, further comprising a controller configured to control the switch, wherein the controller is configured to
- connect, in a case where at least power of the battery is supplied to the at least one drive motor, the step-up circuit to the inverter circuits in parallel, and
- connect, in a case where the battery is charged with regeneratively generated power of the at least one drive motor and the parallel-connection power conversion efficiency is higher than the series-connection power conversion efficiency, the step-up circuit to the inverter circuits in series.

* * * * *